Oct. 27, 1953     E. D. WILSON     2,657,343
COOLING OF RECTIFIER STACK BY THERMAL CONDUCTION
Filed May 8, 1950
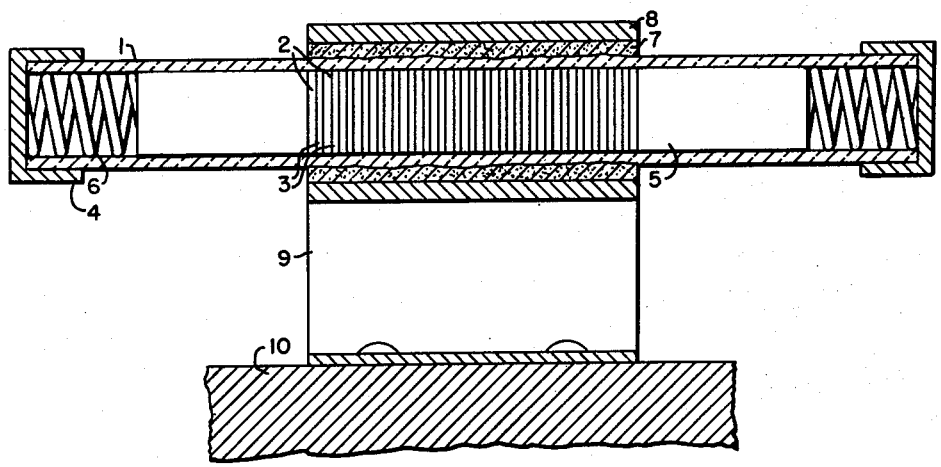
WITNESSES:
INVENTOR
Earl D. Wilson.
BY
ATTORNEY Patented Oct. 27, 1953

2,657,343

UNITED STATES PATENT OFFICE 2,657,343

COOLING OF RECTIFIER STACK BY THERMAL CONDUCTION

Earl D. Wilson, Pittsburgh, Pa., assignor to Westinghouse Electric Corporation, East Pittsburgh, Pa., a corporation of Pennsylvania Application May 8, 1950, Serial No. 160,599

8 Claims. (Cl. 317—234)

My invention relates to dry contact rectifiers, and, in particular, relates to methods of manufacturing and assembling rectifiers of the abovementioned type, of which the selenium rectifier is typical, particularly for producing direct-current voltages of the order of many thousand volts at currents of a few milliamperes.

For certain industrial fields, of which the precipitation of dust and moisture from the atmosphere may be mentioned as one example, it is found desirable to provide direct-current voltage supplies of the order of ten to twenty thousand volts, and from one to twenty milliamperes of current. For this purpose, it has been found possible to economically employ selenium or other dry contact rectifiers; but since the output voltage of a single rectifier disc unit of this type is only of the order of a few volts, it is necessary to provide rectifier structures in which many hundreds of rectifier disc units are connected in series with each other. The disc units comprise a thin layer of crystalline selenium sandwiched between two metal plates. For example, U. S. Patent 2,437,995, to Wayne E. Blackburn, assigned to the assignee of this present application describes such a rectifier in which the enclosing plates are, respectively, of nickel-plated steel and a cadmium-tin alloy.

In the case of the rectifiers typical of the present invention, it has been found that discs of the diameter of 0.17 inch to 0.5 inch are economically desirable. I have found that a desirable thickness for the rectifier units is from eight to thirty mils, or even somewhat broader limits.

Such rectifier disc units as I have just described may conveniently be made by punching them in a punch press from a plate of sheet nickeled steel or other suitable metal, which has previously been coated with selenium, provided with a counter-electrode of tin-cadmium alloy by Schoop spraying the free surface of the selenium, and subsequently heat treating in a manner well known in the selenium rectifier art. The rectifier discs thus formed are assembled one on top of the other in a suitable length of porcelain or Pyrex glass tubing to maintain them securely in position and alignment. The internal bore of the tubing may suitably be two mils greater than the diameter of the discs. Sometimes it may be desirable to have a larger clearance than the above between discs and containing tube, and in such cases the assembly is filled with oil while under vacuum and then hermetically sealed.

The single figure of the drawing illustrates such an assemblage of rectifier discs in a suitable tubular container and support therefor.

The current and voltage capacity ratings of such a rectifier assembly as is shown in the figure depend, in the last analysis, on the ability of the tubular unit to dissipate the heat which is naturally generated in the rectifier discs by the passage of electric current during their use. I have found that in the case of such an assemblage as I have described above, it is possible to produce an output current of about one milliampere with an output voltage of about thirty volts per rectifier disc under ordinary operating conditions where the tubular unit is located in an ambient air temperature of about 25° C. and where there is neither forced circulation of air by blowers or fans or substantial obstruction of natural dissipation of heat by close spacing of other bodies in the neighborhood of the tubular unit.

For many purposes, such units as I have just described are commercially satisfactory, and it is, of course, convenient in making such rectifiers in large quantities under factory conditions to have a standard assemblage in a tubular container of standardized internal and external diameter and general dimensions. By manufacturing such standardized unit rectifiers instead of hand tailoring each rectifier to suit special conditions of operation, automatic machinery may be employed for fabricating the rectifier sheets on which a punch press operates to produce the discs.

As has been previously stated, the problem of current and voltage rating may be reduced to finding an effective way of dissipating the heat developed electrically in the interior of the rectifier discs during their operation. This heat must be dissipated largely by flowing radially outward from the center of the disc to the walls of the containing tube and be dissipated likewise from the latter. The rectifiers can only safely operate if the internal temperatures of the discs, which produce the radial temperature gradient causing this heat flow, are below a certain critical magnitude. There will, of course, be a rather low temperature drop between the center and the rim of each disc as this heat outflow takes place; and a further temperature drop through any space separating the rim of the disc from the containing tube; and, likewise, a temperature drop through the containing tube from its inner to its outer surface. A moment's consideration will show that the external surface of the containing tube having an axial length corresponding to the spacing between rectifier discs must, in the last analysis, dissipate the heat generated in each rectifier disc by conduction to its peripheral surface.

For a given rectifier disc diameter, the external circumference of the tubular member is fixed by factors such as the wall thickness necessary to give sufficient mechanical and dielectric strength to the tube. The minimum wall thickness of the containing tube is thus fixed by such considerations, and, hence, the peripheral circumference of the tube is correspondingly fixed.

In accordance with the principles of my invention, I increase the amount of heat which may be dissipated from each individual rectifier disc by providing the insulating tube containing the rectifier discs with a jacket of good heat-conducting material and, where desirable, also interposing spacers of good heat-conducting material between successive rectifier discs, thereby increasing the ability of the peripheral surface of the enclosing tube to dissipate heat and also increasing the area of said surface which corresponds to each rectifier disc. I am thereby enabled to increase the current passing through the rectifiers to the extent that the heat generated in each disc becomes proportional to the axial distance separating successive discs. This procedure, of course, increases the length of the enclosing tube which is necessary to contain a given number of rectifier discs and, hence, the length of the tube which corresponds to a given terminal voltage rating.

However, this has been found to be the most economical method of obtaining the increased current rating; and it will be noted that since there is no difficulty in connecting rectifiers of this type in series with each other, it is possible to solve practical problems of providing rectifiers of increased current rating while using enclosing tubes of fixed length by merely choosing a lower voltage rating per tubular assemblage and connecting enough tubular units in series to handle the desired load voltage.

In short, if the axial spacing per rectifier disc is doubled, thereby doubling the heat which may be generated per rectifier disc by increased current, the number of discs, and correspondingly, the voltage rating of each standard tubular assemblage is halved; but the desired increase of the direct current derivable from the tubular unit is attained. In the figure I show one embodiment of the foregoing principles.

The spacing units interposed between the rectifier discs in such an arrangement as I have above described may be of the same diameter as the rectifier discs themselves and may be punched from sheet copper, brass or other metal of good heat conductivity by the same punch press which produces the rectifier units themselves. Thus, such an assemblage of spaced rectifier units as I have described may be assembled as in the figure by filling a porcelain, glass or other insulating tube 1 with alternate discs comprising selenium rectifier discs 2, such as I have previously described, and brass spacers 3. Suitable end caps 4 for electrical terminal purposes are affixed to the ends of the above-described assemblage.

In order to effectively dissipate heat flowing radially outward from the rectifier discs through the wall of the tube 1, I coat the surface of the latter in the region in which the rectifier discs are positioned with a layer 7 of metal, preferably doing this by Schoop spraying a metal such as common solder onto the tube 1. To insure firm adherence of the metal layer 7, the surface of the tube 1 may be roughened.

The external surface of the metal layer 7 is surrounded by a closely fitting sheath of copper or some other good heat conductor. The sheath 8 may have a flange 9, preferably integral with it on which the entire rectifier unit may be supported by attachment to a structural member 10 which is maintained at low temperature by reason of its having a large exposed surface, or by reason of artificial cooling.

It will always be necessary in practical service to maintain the terminal caps 4 at different electrical potentials from each other, and in many instances, it will be desirable to maintain both terminal caps insulated from the supporting structure 10. In order to thus effectively insulate the terminal caps 4 from the support structure 10, it will usually be desirable to make the enclosing tube 1 substantially longer than the length of the pile of discs 2, 3. For the purpose of effective heat dissipation from the discs, it will be desirable in most cases to make the length of the copper sheath 8 approximately the same as the axial length of the pile of rectifier discs and spacers and to fill the space which intervenes between the end of the pile of discs and the metal terminal caps 4 with a conducting rod 5, which may, for example, be of brass held in firm contact with the rectifier discs by a compression spring 6, provided adjacent at least one terminal cap 4. Where only one terminal cap 4 need be insulated from the support structure 10, it will, of course, be possible to omit the metal cylinder 5 and spring 6 at one end of the complete unit and, if desired, to connect a metal cap 4 at the other end directly to the metal sheath 8.

The distance between the metal cap 4 and the sheath 8 along the surface of the insulating tube 1 will, of course, be made sufficient to prevent flashover or other difficulties due to the electrical potential gradient along the surface of the tube 1.

While I have described the dry rectifiers assembled in the above-described structure as being selenium rectifiers, it will be evident to those skilled in the art that other dry contact rectifiers may be punched out and similarly assembled, from properly fabricated sheet rectifier material. The diameter, thickness and other dimensions specified above are believed to be the most economical values for the materials mentioned in the foregoing description.

I claim as my invention:

1. A mounting for rectifiers of the disc type comprising an insulating tube in the interior of which rectifier discs are stacked, a conducting terminal on the end of said insulating tube connected to one of said discs by conducting means in the interior of said tube, and a sheathing of good heat-conducting material surrounding said insulating tube in the region occupied by said discs, said sheathing including means for conducting heat away from the sheathing.

2. A mounting for rectifiers of the disc type comprising an insulating tube in the interior of which rectifier discs are stacked, a conducting terminal on the end of said insulating tube connected to one of said discs by conducting means in the interior of said tube, a sheathing of good heat-conducting material surrounding said insulating tube in the region occupied by said discs, and support means of a material having good heat-conductivity attached to said sheath.

3. A mounting for selenium rectifiers of the disc type comprising an insulating tube in the interior of which rectifier discs are stacked, a conducting terminal on the end of said insulating tube connected to one of said discs by conducting means in the interior of said tube, a sheath of good heat-conducting material surrounding said insulating tube in the region occupied by said discs, and means on the sheath for conducting heat away from the sheath.

4. A mounting for selenium rectifiers of the disc type comprising an insulating tube in the interior of which rectifier discs are stacked, a conducting terminal on the end of said insulating tube connected to one of said discs by conducting means in the interior of said tube, a sheath of good heat-conducting material surrounding said insulating tube in the region occupied by said discs, and support means of a material having good heat conductivity attached to said sheath.

5. A rectifier assembly comprising an aligned stack of rectifier discs, an enclosing tube for said stack which is of insulating material and has an inside diameter such that it makes good thermal contact to the peripheries of said discs, caps of conducting material on the respective ends of said tube, electrical conducting means within said tubes connecting said caps to the respective end discs of said rectifier stack, at least one of said conducting means being long enough to separate one of said caps by a substantial distance from the nearest rectifier disc, a sheath of good heat-conducting material surrounding the surface of said tube in the region occupied by said discs, and a flange extending radially from said sheath for conducting heat away from the sheath.

6. A rectifier assembly comprising an aligned stack of rectifier discs, an enclosing tube for said stack which is of insulating material and has an inside diameter such that it makes good thermal contact to the peripheries of said discs, caps of conducting material on the respective ends of said tube, electrical conducting means within said tubes connecting said caps to the respective end discs of said rectifier stack, at least one of said conducting means being long enough to separate one of said caps by a substantial distance from the nearest rectifier disc, a sheath of good heat-conducting material surrounding the surface of said tube in the region occupied by said discs, and means for cooling said sheath, said means for cooling comprising a connection of good heat-conducting material for supporting said sheath.

7. A rectifier assembly comprising an aligned stack of rectifier discs, an enclosing tube for said stack which is of insulating material and has an inside diameter such that it makes good thermal contact to the peripheries of said discs, caps of conducting material on the respective ends of said tube, electrical conducting means within said tubes connecting said caps to the respective end discs of said rectifier stack, at least one of said conducting means being long enough to separate one of said caps by a substantial distance from the nearest rectifier discs, a sheath of copper surrounding the surface of said tube in the region occupied by said discs, and means for cooling said sheath, said means for cooling comprising a connection of good heat-conducting material for supporting said sheath.

8. A selenium rectifier assembly comprising an aligned stack of rectifier discs, an enclosing tube for said stack which is of insulating material and has an inside diameter such that it makes good thermal contact to the peripheries of said discs, caps of conducting material on the respective ends of said tube, electrical conducting means within said tubes connecting said caps to the respective end discs of said rectifier stack, at least one of said conducting means being long enough to separate one of said caps by a substantial distance from the nearest rectifier disc, a sheath of copper surrounding the surface of said tube in the region occupied by said discs, and means for cooling said sheath, said means for cooling comprising a connection of good heat-conducting material for supporting said sheath.

EARL D. WILSON.

References Cited in the file of this patent

UNITED STATES PATENTS

| Number | Name | Date |
|---|---|---|
| 2,042,542 | Masnou | June 2, 1936 |
| 2,454,846 | Skinker | Nov. 30, 1948 |
| 2,498,666 | Escoffery et al. | Feb. 28, 1950 |
| 2,539,894 | Cubitt | Jan. 30, 1951 |